(12) United States Patent
Florexil (10) Patent No.: US 10,391,813 B2
(45) Date of Patent: Aug. 27, 2019

(54) MULTIPLE CHAMBER PNEUMATIC TIRE

(71) Applicant: Wagner Florexil, Riverview, FL (US)

(72) Inventor: Wagner Florexil, Riverview, FL (US)

( * ) Notice: Subject to any disclaimer, the term of this patent is extended or adjusted under 35 U.S.C. 154(b) by 457 days.

(21) Appl. No.: 15/130,977

(22) Filed: Apr. 16, 2016

(65) Prior Publication Data

US 2016/0303908 A1    Oct. 20, 2016

Related U.S. Application Data

(60) Provisional application No. 62/149,356, filed on Apr. 17, 2015.

(51) Int. Cl.
| | |
|---|---|
| B60C 5/20 | (2006.01) |
| B60C 5/22 | (2006.01) |
| B60C 11/16 | (2006.01) |
| B60C 19/12 | (2006.01) |
| B60C 29/00 | (2006.01) |
| B29C 73/22 | (2006.01) |
| B29C 73/18 | (2006.01) |

(52) U.S. Cl.
CPC ............... B60C 5/22 (2013.01); B29C 73/18 (2013.01); B29C 73/22 (2013.01); B60C 11/1612 (2013.01); B60C 19/122 (2013.01); B60C 19/127 (2013.01); B60C 29/007 (2013.01)

(58) Field of Classification Search
CPC .... B60C 5/00; B60C 5/02; B60C 5/22; B60C 5/24
See application file for complete search history.

(56) References Cited

U.S. PATENT DOCUMENTS 2,440,107 A * 4/1948 Maddox .................... B60C 5/20
152/342.1

\* cited by examiner

*Primary Examiner* — Justin R Fischer
(74) *Attorney, Agent, or Firm* — Tiffany C. Miller; Inventions International Inc.

(57) ABSTRACT

A multiple chamber pneumatic tire having an upper section and a lower section. A diaphragm separates the upper section from the lower section. The lower section has at least two chambers. The chambers each have a chamber valve, a nail guard layer, a plurality of fibers having an end connected to an inner wall surface of a chamber, and an interconnected barrier connected to at least two portions of a chamber wall surface. The upper section of the tire has at least one linkage located within at least one tube with a primary end connected to a chamber valve of a chamber and a secondary end connected to a tire rim or to a main valve. A tire pressure monitoring system can be in communication with a chamber valve. The tire can have a ring with at least one retractable stud.

13 Claims, 9 Drawing Sheets

MULTIPLE CHAMBER PNEUMATIC TIRE

CROSS REFERENCE TO RELATED APPLICATIONS

This application is a non-provisional application, entitled, "Multiple Chamber Pneumatic Tire," which claims priority to U.S. Provisional Patent Application No. 62/149,356 filed Apr. 17, 2015, entitled, "FLAT FREE TIRE WITH MULTIPLE CHAMBERS WITH THEIR OWN VALVE AND SEPARATION OF THE LOWER SECTION OF THE TIRE WHERE IT MEETS THE ROAD WITH THE REST OF THE TIRE WITH SOME MODIFICATIONS IN LOW PROFILE TIRES AND THE ADDITION OF RETRACTABLE AND POSSIBLY EXCHANGEABLE STUBS FOR AN ALL SEASONS MODEL."

BACKGROUND OF THE INVENTION

1. Field of the Invention

This invention relates, generally, to a pneumatic tire. More particularly, it relates to a multiple chamber pneumatic tire having a simultaneous inflating system and an interconnected chamber barrier.

2. Background Art

Currently, pneumatic tires are used on vehicles and bicycles. These pneumatic tires are filled with compressed air. A common problem with pneumatic tires occurs when an object such as a nail penetrates through the wall of a tire and creates an opening for the compressed air to be released from the tire. This results in the tire becoming flat and inoperable for a user to operate the vehicle or bicycle. It would be more desirable for a pneumatic tire to have an interconnected chamber barrier for the tire to withstand being penetrated by an object and still be fully functioning and operable by a user.

It is hazardous to the safety of a driver, an occupant of a vehicle, and surrounding bystanders if a tire expels enough compressed air to the point that the air pressure of the tire can no longer perform its function. Many times, individuals find themselves in dangerous situations due to a flat tire such as a being stranded on the side of a busy road. It is a burden on an individual to have to repair or replace a punctured tire. Moreover, not everyone has the ability to change a tire. Thus, there is a need for a tire having an internal sealing structure which provides a barrier between a puncture or breach and an internal chamber that is retaining a portion of the compressed air.

Many pneumatic tires on the market today will deflate completely once punctured. There is a need for a pneumatic tire that will remain inflated even after being penetrated by a variety of types and sizes of sharp objects capable of puncturing through a tire wall including, but not limited to, a nail or a screw. It would be more desirable for a user to be able to continue driving on a punctured tire. Thus, there is a need for a tire having a barrier configured to seal closed the opening of a puncture of a tire.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a multiple chamber pneumatic tire having an upper section and a lower section. A diaphragm separates the upper section from the lower section. The lower section has at least two chambers. The at least two chambers each have a chamber valve, a nail guard layer, a plurality of fibers having an end connected to a surface of a chamber wall surface, and an interconnected barrier connected to at least two portions of a chamber wall surface. The upper section of the tire has a rod and at least one linkage located within at least one tube with a primary end connected to a chamber valve of a chamber and a secondary end connected individually to a tire rim or to a rod of a main valve. A tire pressure monitoring system is in communication with at least one chamber. The tire pressure monitoring system has a primary opening and a secondary opening in communication with at least one chamber. The tire can have at least one retractable stud which also includes improvements that overcome the limitations of prior art multiple chamber pneumatic tires is now met by a new, useful, and non-obvious invention.

The novel multiple chamber pneumatic tire operates by separating the bottom part of the tire where it meets the road with the rest of the tire where it meets the rim for most tires and use multiple chambers with independent valves that may or may not be connected to a main valve. The separation between the bottom of the tire with the rest of the tire may or may not be a possibility in low profile tires but they can have multiple chambers with their own valves which could be connected to a common valve or exit the rim as independent valves. The bottom of the tires will have individual tubes with their own valves, therefore, only a small amount of air will be lost after the tire gets punctured and will remain functional. The assembly could be fused with the tire or used as a separate product that can be added to any conventional tire with the addition of inner wall ridges. This invention can be applied to any current or future tire technology.

In a preferred embodiment, when the tire is punctured by a nail or by a sharp object of a certain size, the tire will remain operational. Immediate repair of the punctured tire would not be necessary. In most cases, the tire can stay with a hole and remain operational for weeks, months, years, or for the lifetime of the tire.

In a second embodiment, the novel pneumatic tire could also have an all season tire version with retractable studs and possibly exchangeable studs. These studs could stay in the tire without the need to remove them after the winter season is over due to the fact that they can be retracted within the tire. These studs can be retracted or pushed out of the tire using including, but not limited, to hydraulic pressure, compressed air, mechanical, or an electronic mechanism. A device that can monitor the condition of the road could be attached to the rim or to the tire. The device could be connected to the retractable studs system to facilitate the movement of the retractable studs in or out when necessary. This device could be triggered automatically or manually or could even be turned off. It is within the scope of this invention for the studs to be made of a material including, but not limited to, metal, rubber, plastic, sand like materials, or a combination of more than one type of material. One or more types and shapes of studs can be mounted on an all season tire. These mechanisms together would allow better traction and even improve stopping distance especially in bad weather.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
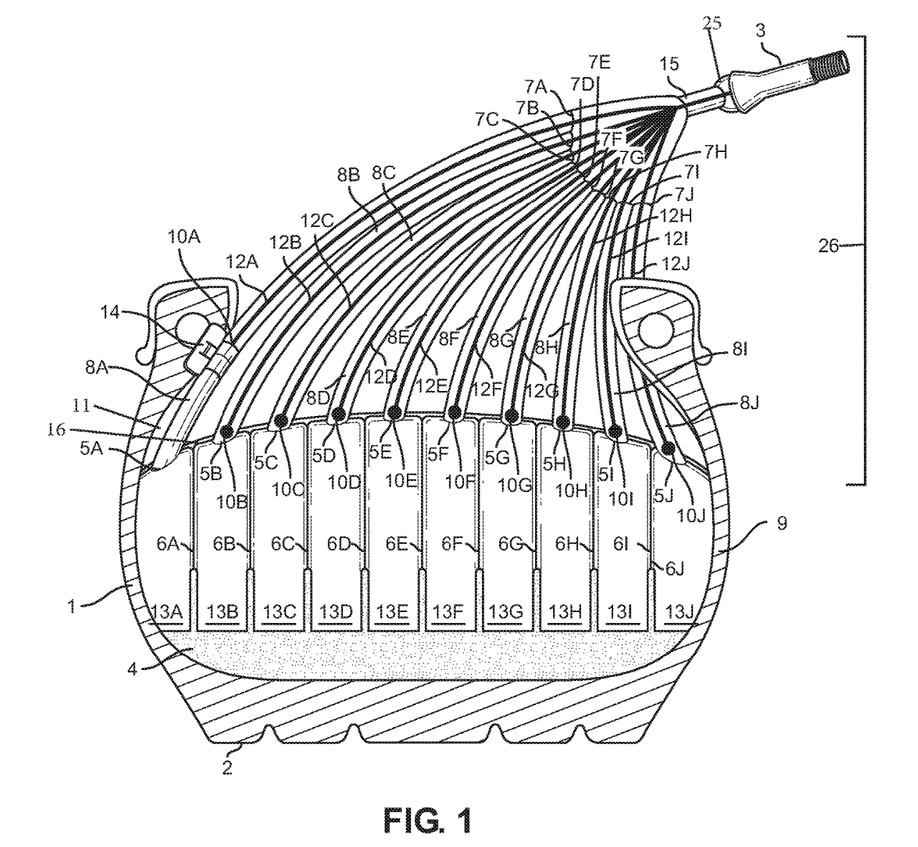
FIG. 1 is a perspective cut-away view of the novel multiple chamber pneumatic tire having a gas receiving fitting in pneumatic communication with a plurality of chambers, a plurality of tubes each have a primary end connected to a chamber valve located opposite a secondary end connected to a main valve.

In a general embodiment FIG. 1 shows a cross section of pneumatic tire 1 having tread layer 2. Nail guard 4 provides some resistance to sharp objects (not shown) and also prevents sharp objects from moving excessively inside pneumatic tire 1 after penetration. It is within the scope of this invention for nail guard 4 to be made of a material including, but not limited to, a material having a honeycomb structure, foam, or rubber. For example, a thick layer of rubber can retain a sharp object such as a nail and prevent the nail from breaching adjacent chambers. Tire 1 has lower section 9 and upper section 11. Lower section 9 has a plurality of chambers 13A-13J. The dividers 6A-6I for the lower chambers 13A-13I could have the same or different thickness. The dividers 6A-6I can be made of a material such as plastic, rubber, or metal. In a preferred embodiment, the lower portion of dividers 6A-6I can be made of rubber to facilitate the collapsing of the chamber. It is within the scope of this invention for dividers 6A-6I to have a tapered configuration. The lower portion of a divider can be thicker than the upper portion of the divider as shown in FIG. 1.

Tubes 8A-8J will be attached to chamber valves 10A-10J of lower chambers 13A-13J of tire 1. For example, tube 8A has primary end 5A located opposite secondary end 7A. Tube 8B has primary end 5B located opposite secondary end 7B. Tube 8C has primary end 5C located opposite secondary end 7C. Tube 8D has primary end 5D located opposite secondary end 7D. Tube 8E has primary end 5E located opposite secondary end 7E. Tube 8F has primary end 5F located opposite secondary end 7F. Tube 8G has primary end 5G located opposite secondary end 7G. Tube 8H has primary end 5H located opposite secondary end 7H. Tube 8I has primary end 5I located opposite secondary end 7I. Tube 8J has primary end 5J located opposite secondary end 7J.

FIG. 1 illustrates each tube 8A-8J having a linkage 12A-12J. For example, linkage 12A is located inside of tube 8A. Linkage 12B is located inside of tube 8B. Linkage 12C is located inside of tube 8C. Linkage 12D is located inside of tube 8D. Linkage 12E is located inside of tube 8E. Linkage 12F is located inside of tube 8F. Linkage 12G is located inside of tube 8G. Linkage 12H is located inside of tube 8H. Linkage 12I is located inside of tube 8I. Linkage 12J is located inside of tube 8J.

FIG. 1 best illustrates each chamber 13A-13J having a chamber valve 10A-10J. For example, chamber 13A has chamber valve 10A. Chamber 13B is connected to chamber valve 10B. Chamber 13C is connected to chamber valve 10C. Chamber 13D is connected to chamber valve 10D. Chamber 13E is connected to chamber valve 10E. Chamber 13F is connected to chamber valve 10F. Chamber 13G is connected to chamber valve 10G. Chamber 13H is connected to chamber valve 10H. Chamber 13I is connected to chamber valve 10I. Chamber 13J is connected to chamber valve 10J. It is within the scope of this invention for a chamber to be reinforced with a thicker wall at the bottom of the chamber or with a metal layer.

Figure 2A:
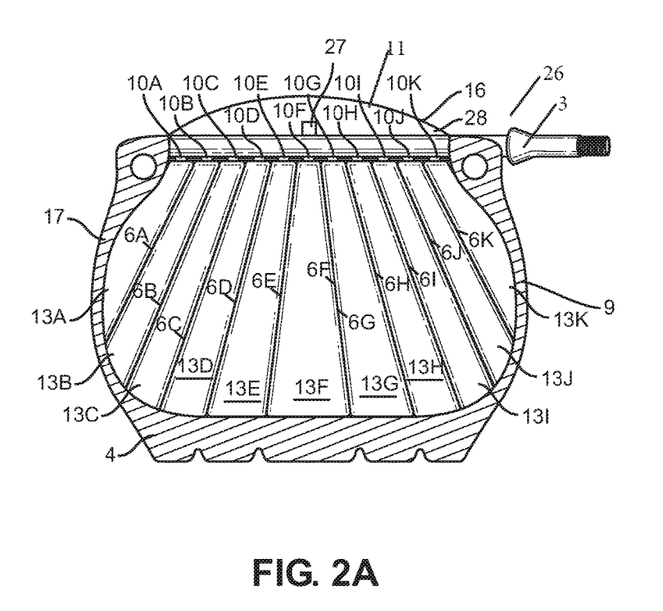
FIG. 2A is a perspective view of an alternate embodiment of the novel multiple chamber pneumatic tire having a plurality of chambers each connected to a chamber valve and having a diaphragm chamber connected to a valve.
Figure 2B:
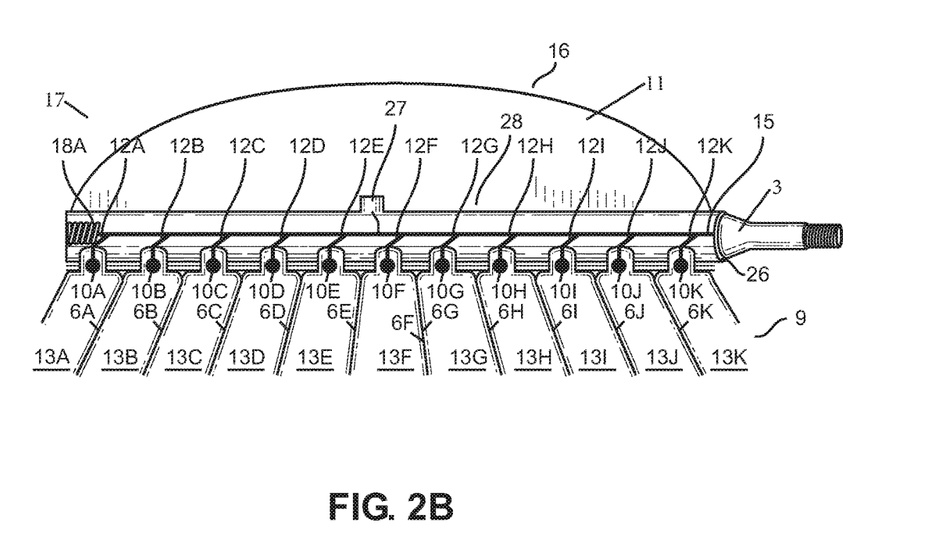
FIG. 2B is a perspective cut-away view of the novel multiple chamber pneumatic tire having a receiving fitting with a rod in communication with a biasing mechanism.

FIGS. 1 and 2B best illustrate linkages 12A-12K have an end connected to at least one chamber valve 10A-10K located opposite another end 7A-7J connected to rod 15. Rod 15 is in communication with main valve 3. Linkages 12A-12K will push the chamber valves 10A-10K open when rod 15 of main valve 3 is pushed or depressed.

FIG. 1 depicts embodiments of the possible location of Tire Pressure Monitoring System 14 which could measure the air pressure on one or multiple sections of tire 1. In another embodiment, tire pressure monitoring system 14 can be connected to at least one chamber valve, chamber, or tubing. For example, tire pressure monitoring system 14 could be placed before or after chamber valve 10A.

Linkages 12A-12J are connected to the chamber valves 10A-10J of tire 1 independently or could also be joined together by rod 15 to the top as seen in FIGS. 1 and 2B. Lead line 3 shows the common valve. It is also important to mention the valves 10A-10J at the bottom can go all the way to the top of tire 1 while maintaining their individual tubing 8A-8J and an example of this can be seen in FIG. 7. FIG. 1 depicts diaphragm 16 which will separate tire 1 in layers between lower section 9 and upper section 11. The thickness, shape, and material composite of diaphragm 16 could vary depending on tire 1 and it could be solid or flexible to facilitate installation and removal of the tire. It is within the scope of this invention for the diaphragm to be any shape including, but not limited to, curved upward, curved downward, flat, or a zigzag. Although not seen in FIG. 1, the upper section 11 of tire 1 could be filled with spongy like materials (not shown).

FIGS. 2A and 2B show the cross section of a low profile tire 17 having multiple chambers 13A-13K with nail guard 4 (FIG. 2A). A plurality of dividers 6A-6K is configured to separate lower section 9 of tire 17 into a plurality of chambers 13A-13K. The plurality of chambers 13A-13K each have at least one valve 10A-10K. Tire 17 has a receiving fitting 26 which is best seen in FIG. 2B. Both FIGS. 2A and 2B illustrate upper section 11 of tire 17 being configured to abut a rim (not shown).

FIGS. 2A and 2B illustrate diaphragm chamber 28 having diaphragm 16 and diaphragm chamber valve 27. The diaphragm 16 of diaphragm chamber 28 is configured to abut a rim. FIG. 2B shows lower section 9 of tire 17 having chambers 13A-13K being separated by dividers 6A-6K. Receiving fitting 26 (FIGS. 1, 2A, and 2B) is pneumatically connected to plurality of chambers 13A-13J (FIG. 1) and 13A-13K (FIGS. 2A and 2B). Receiving fitting 26 has at least one rod 15. Rod 15 is connected to plurality of linkages 12A-12K. Rod 15 is configured to open at least one chamber valve 10A-10K when rod 15 is depressed causing at least one biasing mechanism 18A to deflect. It is within the scope of this invention for biasing mechanism 18A to be located in the front of the valve. It is within the scope of this invention for the receiving fitting 26 to not be in communication with a diaphragm chamber 28. In an alternate embodiment, receiving fitting 26 is configured to abut a rim.

Figure 3:
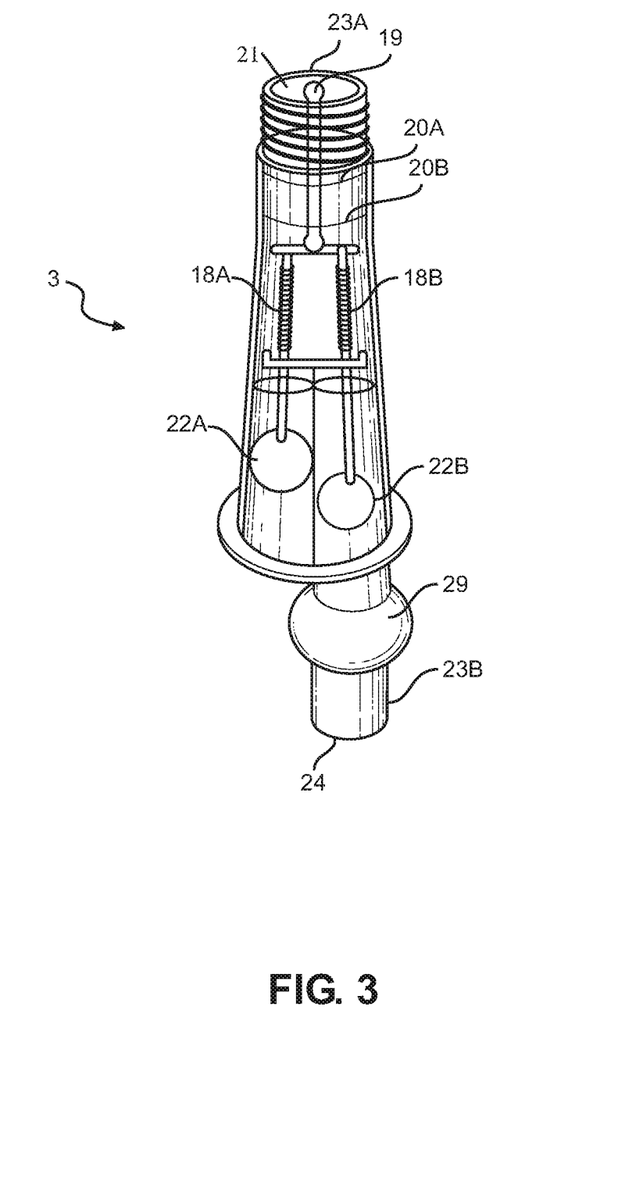
FIG. 3 is a perspective cut-away view of the main valve for inflation of a pneumatic tire.

FIG. 3 illustrates main valve 3 having threaded primary end 23A having opening 21 and tip 19 of main valve 3 is where the pump (not shown) will be attached to deliver air to upper section 11 and/or lower section 9 of tire 1. Markers 20A-20B could be place outside the main valve 3 to facilitate the differentiation between the filling of the diaphragm chamber 28 (FIGS. 2A and 2B) of the upper chamber 11 and other sections of the tire such as the lower section 9 of a tire. For example, when the pump (not shown) is pushed up to marker 20A, only the chambers 13A-13J (FIG. 1) of lower section 9 of tire 1 will be open for filling. Another marker 20B will be place outside main valve 3. In another example, when the pump (not shown) is pushed to marker 20B, the diaphragm chamber 28 of the upper section 11 of tire 1 (FIG. 1) will be open for filling while the air to chambers 13A-13J of lower section 9 may or may not be blocked. It is within the scope of this invention for valve 3 to be modified to fill both upper section 11 and lower section 9 of a tire simultaneously.

At least one spring or biasing mechanism 18A-18B will help to bring the valve back to the closing position. Primary rubber portion 22A will control the airflow to the upper section 11 of the tire while secondary rubber portion 22B will control the airflow to lower section 9 of the tire. Section 29 of main valve 3 facilitates the filling of the lower chambers 13A-13K when the pump is pushed to marker 20A, and at the same time block the flow of air to the lower chambers 13A-13K when the pump is pushed to the second mark 20B. Main valve 3 has secondary end 23B having an opening 24. Opening 24 is the point of attachment of the main valve 3 to the equilibrium chamber 25 as seen in FIG. 1.

Figure 4:
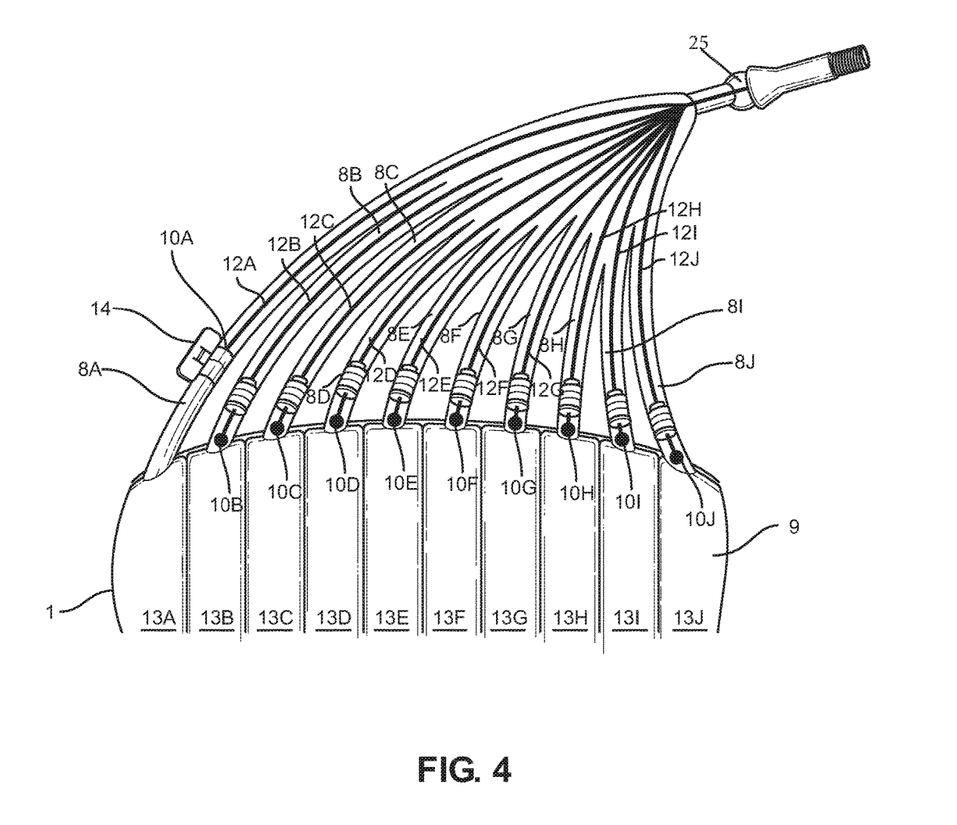
FIG. 4 is a perspective cut-away view of the novel multiple chamber pneumatic tire having a plurality of chambers each chamber connected to a chamber valve, a plurality of tubes containing linkages are shown, each tube and linkage having a primary end connected to a chamber valve located opposite a secondary end connected to a main valve.

FIG. 4 depicts tubes 8A-8J and valves 10A-10J assembled to plurality of chambers 13A-13J of lower section 9. Plurality of tubes 8A-8J are connected to the lower chambers 13A-13J. Plurality of tubes 8A-8J can join together and form the equilibrium chamber 25 but they can also individually go to rim 30 of the tire as seen in an alternate embodiment in FIG. 7. Plurality of linkages 12A-12J are configured to allow opening and closing of plurality of valves 10A-10H to plurality of chambers 13A-13J of lower section 9 of tire 1. Tire pressure monitoring system 14 is configured to measure the air pressure in one or more sections of the tire.

Figure 5:
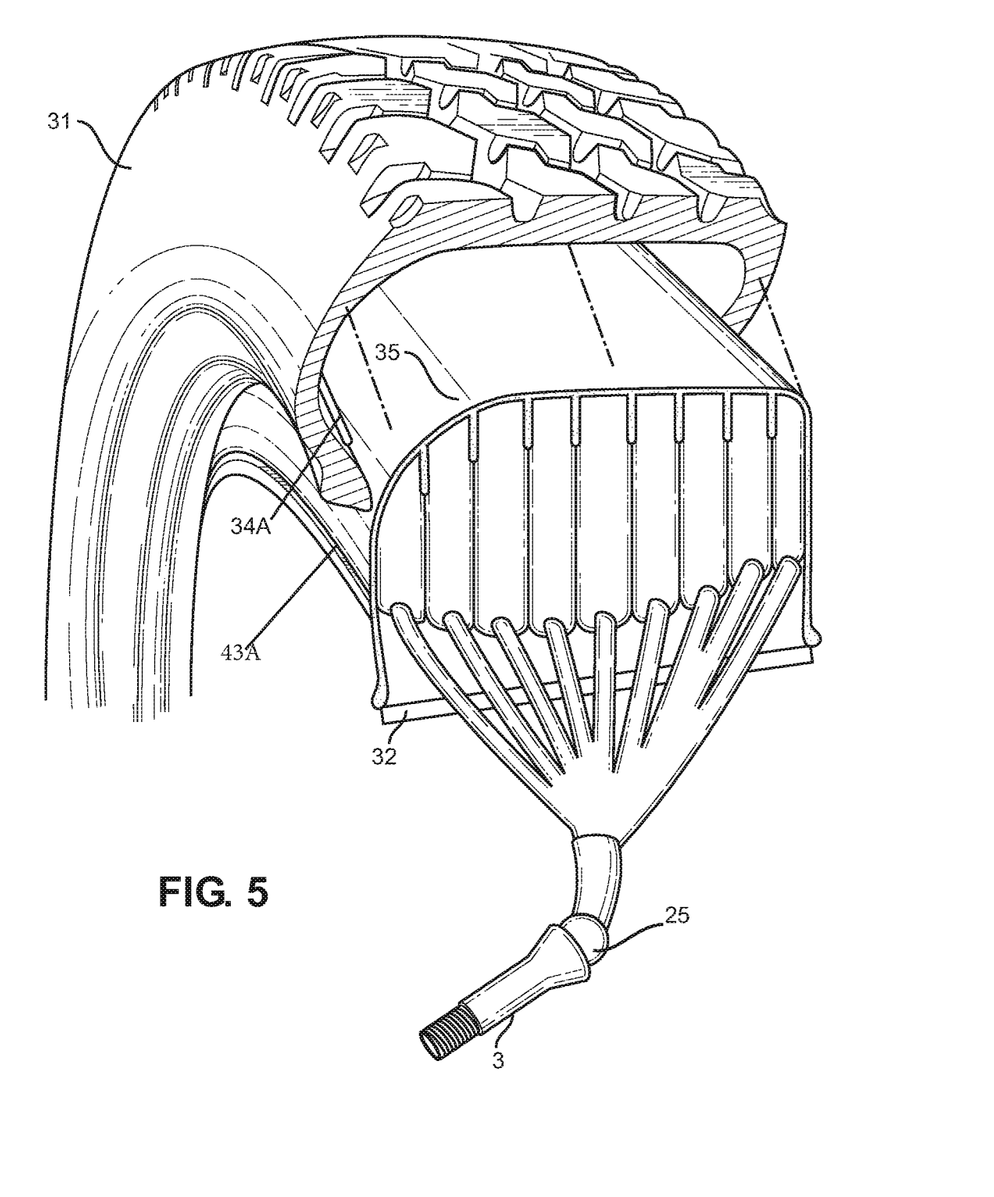
FIG. 5 is a perspective exploded cut-away view of an alternate embodiment of the novel tire having a ridge formed on an inner wall of the tire, the ridge interlocks with a corresponding ridge of an inner tube.
Figure 7:
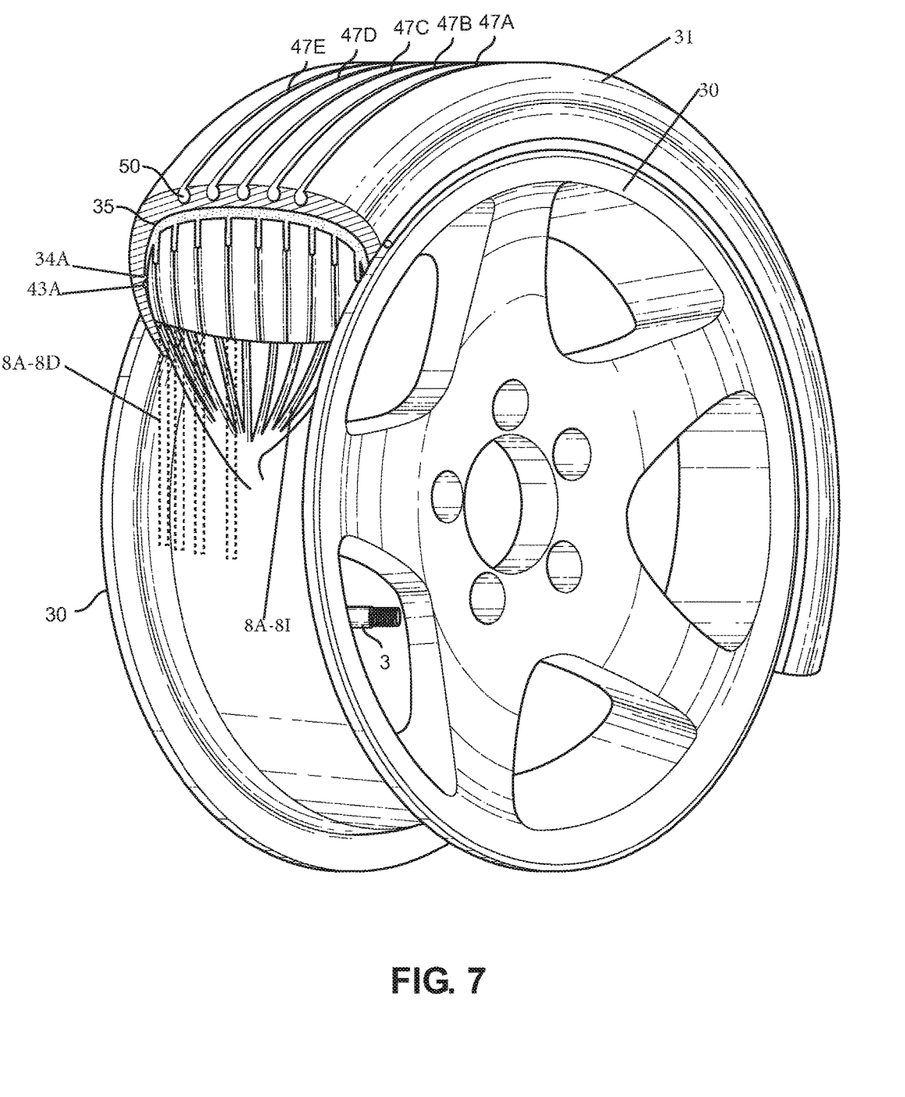
FIG. 7 is a perspective cut-away view of an alternate embodiment of the novel tire having a ridge formed on an inner wall of the tire, the ridge interlocks with a corresponding ridge of an inner tube, each chamber of the multiple chamber tire is connected to a valve and tubing, each chamber can be filled individually or simultaneously.

FIG. 5 illustrates main valve 3 in communication with equilibrium chamber 25. FIG. 5 shows an alternate embodiment of inner tube 35 having one of multiple bars 32 that could be added across tire 31 to help keep tire 31 on rim 30 (FIG. 7). This product assembly will have different sizes to fit different tires and they can be partially or entirely fused with the tire or stay as a product that can be inserted in existing tires.

In another embodiment depicted in FIGS. 5 and 7, tire 31 has primary ridge 34A and a secondary ridge (not shown) formed on an inner wall surface of tire 31. The primary ridge 34A and secondary ridge (not shown) are configured to interlock with corresponding ridge 43A and a second ridge (not shown) of inner tube 35. Inner tube 35 can be a separate assembly configured to connect to an existing tire 31. Ridges of tire 31 will retain inner tube 35 within tire 31 especially when inflated. Primary ridge 34A and a secondary ridge (not shown) are both needed if inner tube assembly 35 is not integrally formed within the tire.

It is within the scope of this invention for the ridges or groves of the tire and the inner tube to be threaded. The interlocking ridges of the tire and the inner tube can be secured with at least one fastener such as a screw. The ridges can be rigid or flexible. The flexibility allows movement of the diaphragm with pressure. It is also within the scope of this invention for at least a portion of the diaphragm to be made of a pliable material such including, but not limited to, rubber roam, or plastic. In an alternate embodiment, a sealing material could be added between the interlocking ridges to help form an air tight seal between a the upper and lower sections.

Figure 6:
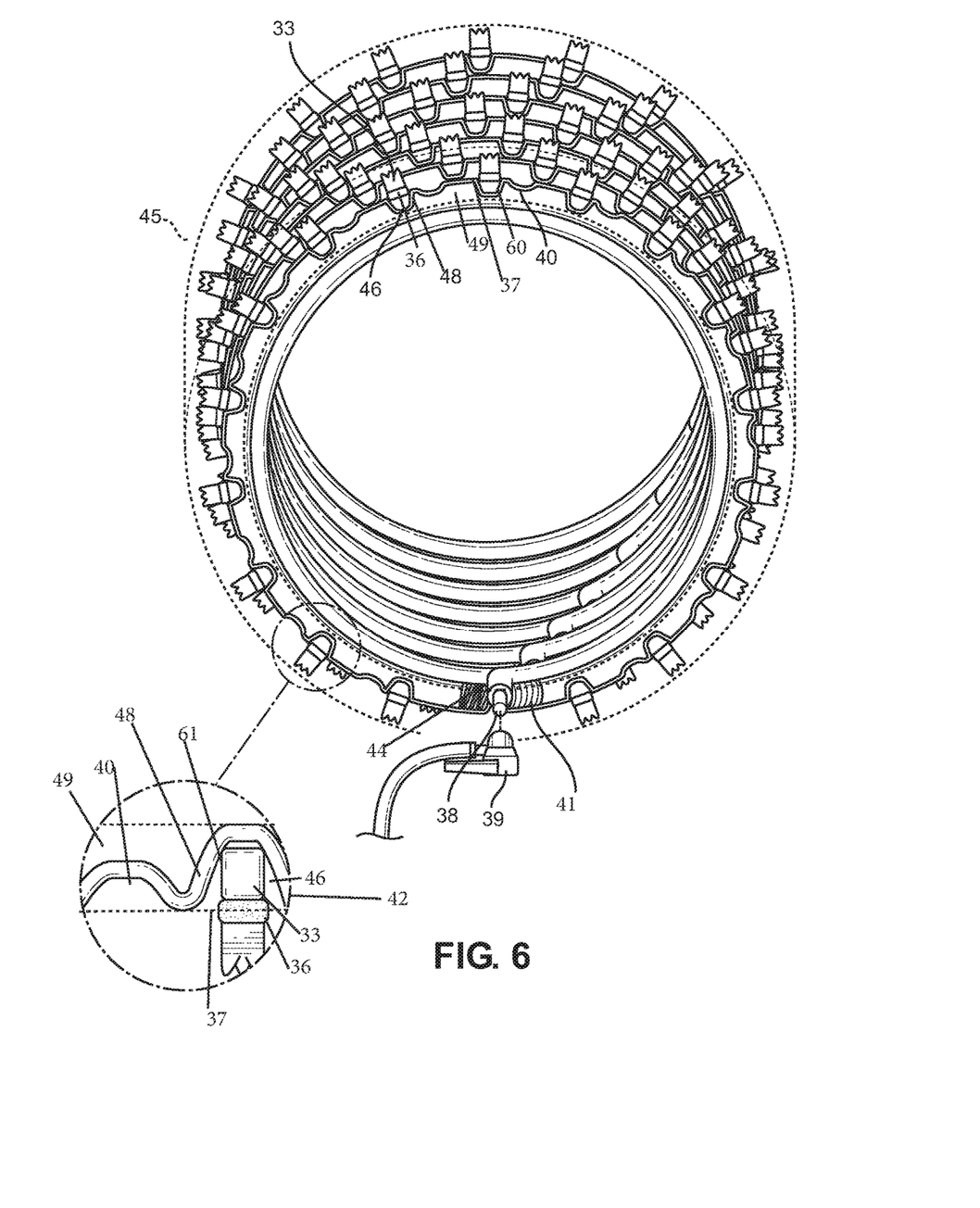
FIG. 6 is a perspective view of an alternate embodiment of the novel tire having a ring supporting a plurality of retractable studs.

FIG. 6 illustrates a plurality of rings 49 each having a plurality of retractable studs 33 that could be used for winter tires. Each ring 49 is located within an opening 47A-47E (FIG. 7) of tire 45 (FIGS. 6 and 7). Plurality of retractable studs 33 are configured to protrude from at least one opening 47A-47E of tire 45 when a pneumatic force is applied to at least one ring 49, thereby, shifting at least one ring to communicate with at least one retractable stud 33. Ring 49 has plurality of detents 40. Ring 49 has a plurality of recesses 46. At least one recess 46 has ramp 48 positioned adjacent to a recess 40. Recesses 46 houses a portion of stud 33 when stud 33 is in a retracted orientation 42 in relation to tire 45.

For example, when a pneumatic force is applied to ring 49, a lower portion of stud 33 is moved across ramp 48 and the lower portion of stud 33 is retained within detent 40. When pneumatic pressure is applied to ring 49, the ring 49 is forced to move and will move to a different groove depending on how much pressure is applied and therefore, push the studs 33 out of the tire 45. The more pressure that is applied, the more the studs 33 will protrude from a surface of tire 45.

In a preferred embodiment, a tire 45 has at least one retractable stud 33. A ring 49 has at least one recess 46. The recess 46 is configured to house at least one retractable stud 33 in a retracted orientation 42 when the ring 49 is oriented in a first position. At least one recess 46 has a ramp 48 configured to guide an end of at least one retractable stud 33 into a detent 40 when the ring 49 is oriented in a second position. The detent 40 supports at least one retractable stud 33.

In an alternate embodiment, the ring is rotated, whereby, at least one retractable stud protrudes from the tire when a pneumatic force is applied to the ring.

In a preferred embodiment, an end of at least one retractable stud 33 has at least one tapered surface 60 (FIG. 6). The tapered surface is configured to contact the ramp. It is within the scope of this invention for at least one retractable stud to have a non-tapered surface 61 (FIG. 6).

In yet another embodiment, a portion of at least one retractable stud 33 is removable from ring 49. Ring 49 can be housed within support structure 37 (FIG. 6). At least one retractable stud 33 can be fastened to a portion of support structure 37 with stud cover 36. It is within the scope of this invention for the term fastened to include, but not be limited to, screwed into, adhered to, or snapped into place. Stud cover 36 can be integrally formed of or be in communication with a resilient material including, but not limited to, a spring or rubber.

In yet another embodiment, a ring is biased in a first position by a spring.

It is within the scope of this current invention for the studs 33 to be removable or permanently attached to the tire. Retractable studs 33 can have different shapes and sizes. One or more than one shape and size of stud 33 can be mounted to the support structure embedded within the tire.

FIG. 6 further depicts valve 38 being configured to push retractable studs 33 out of the tire by adding pressure and retracting them by removing pressure. It is within the scope of this invention for there to be more than one valve (not shown). It is within the scope of this invention for the pressure to include, but not be limited to, mechanical pressure, air pressure, or fluid pressure. In an example, electronic pump 39 could be connected to the tire rim (not shown) and be connected to valve 38. Electronic pump 39 is configured to automatically deploy and retract the studs when necessary using electronic sensors. It is within the scope of the current invention for other pressure systems (not shown) to be used to move the studs such as pressurized can or hydraulic fluid transfer.

FIG. 6 shows ring 49 being moved by pneumatic or hydraulic cylinder 41. Pneumatic or hydraulic cylinder 41 pushes plurality of rings 49 when pressure is applied. Spring 44 brings back ring 49 when pressure is removed from pneumatic or hydraulic cylinder 41. In an alternate embodiment, small metal plates or hard plastic (not shown) could be inserted to protect these moving parts.

FIG. 7 shows an example of the openings 47A-47E in which studs 33 will protrude from tire 45. Support structure 37 of ring 49 is retained by compartments 50 each having an opening 47A-47E.

Figure 8:
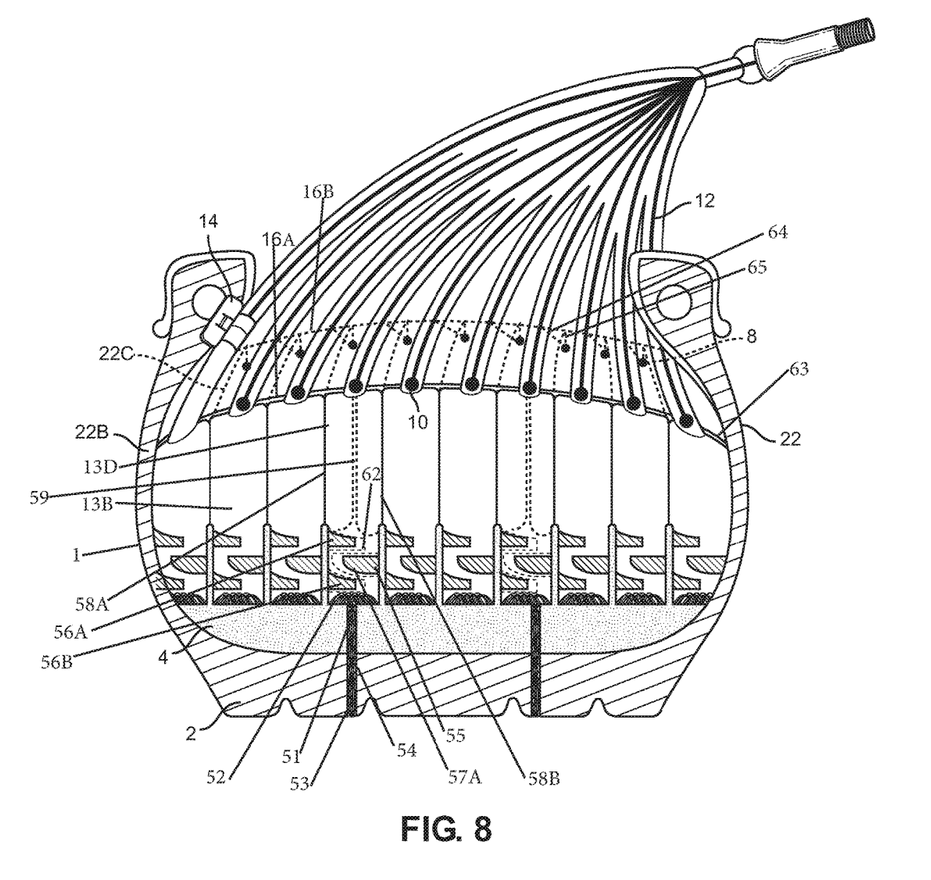
FIG. 8 is a perspective cut-away view of an alternate embodiment of the novel multiple chamber pneumatic tire having a plurality of chambers each chamber having a nail guard, a plurality of fibers, and an inter connected barrier connected to a chamber wall surface, the fibers having an end connected to a chamber wall surface and another end configured to seal a breach; and, FIG. 9 is a perspective cut-away view of an alternate embodiment of the novel multiple chamber pneumatic tire having an inter connected barrier connected to a chamber wall surface, the chamber having a breach can collapse and engage the interconnected barrier to form a sealing structure.

As illustrated in FIG. 8, pneumatic tire 1 has multiple chambers. In a preferred embodiment, at least one chamber 13 has nail guard layer 4. Nail guard layer 4 overlays a tread portion 2 of tire 1. Tire 1 has a plurality of fibers 51. Plurality of fibers 51 each have a primary end 52 connected to an inner wall of tire 1 located opposite secondary end 53. Secondary end 53 of plurality of fibers 51 is configured to fill breach 54 of tire 1.

Figure 9:
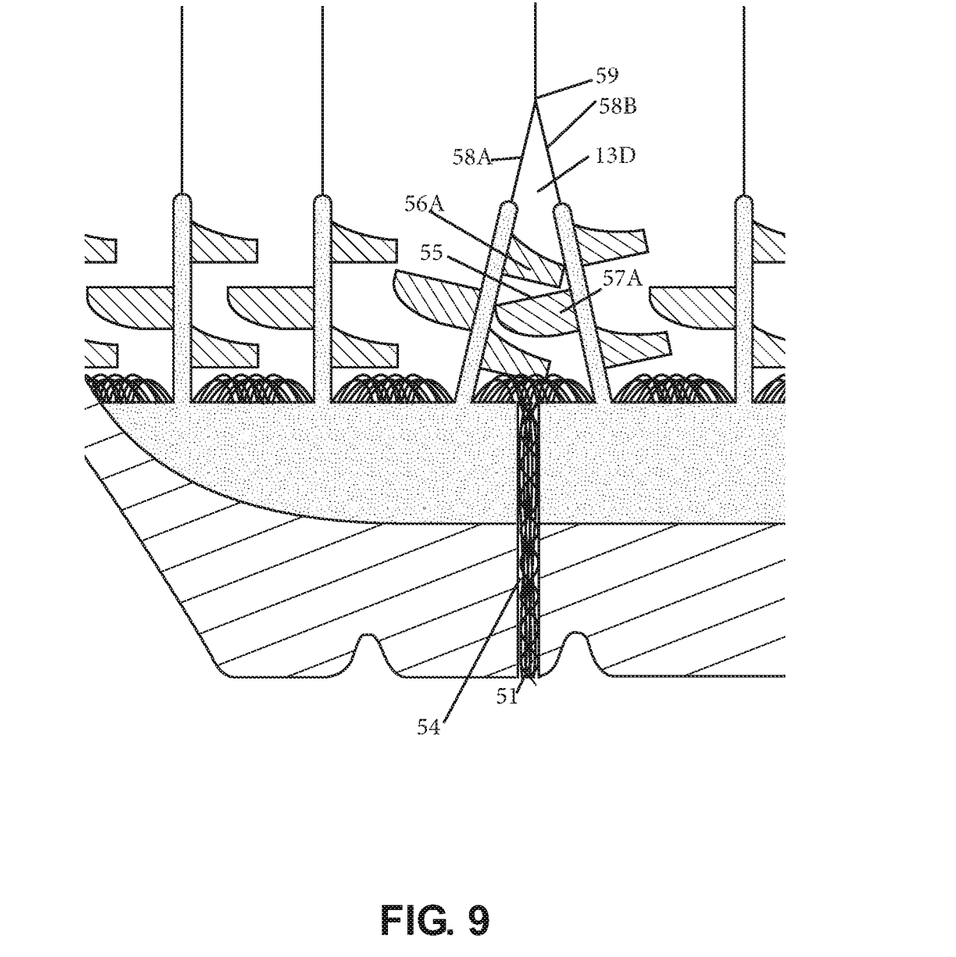

For example, when a nail punctures a tire a breach is formed. A portion of plurality of fibers 51 exits a chamber through breach 54 (FIGS. 8 and 9). The force of the air pressure being expelled from the chamber through breach 54 of the tire positions secondary end 53 of plurality of fibers 51 within breach 54. A portion of plurality of fibers 51 is located within breach 54 and creates a barrier to reduce the flow of air out from the tire.

It is within the scope of this current invention for a plurality of threadlike objects or fibers to have a primary end connected to any surface of a chamber wall. The plurality of fibers can each have the same diameter throughout the length of each fiber. In an alternate embodiment, the plurality of fibers do not have to be connected to a chamber wall surface (not shown). The plurality of fibers can be loose and retained within a chamber.

In an alternate embodiment, the plurality of fibers can have a tapered configuration (not shown), whereby, the primary end of a fiber can have a diameter greater in size than the diameter of the secondary end of the fiber. At least one fiber of a plurality of fibers has a tapered configuration. At least one fiber has a first end being a first diameter and a second end having a second diameter. The first diameter is greater in size than the second diameter.

In an alternate embodiment, plurality of fibers 51 can have a contrasting color, whereby, the contrasting color differs from a color of tire 1. A contrasting color or a vibrant color of the plurality of fibers will serve as a visual marker to a user (not shown) of the location of a breach. Secondary end 53 of plurality of fibers 51 are retained within breach and can be visually located by a user. IT is within the scope of this invention for the color to be any color even if the color is the same as the tire.

In an alternate embodiment, plurality of fibers 51 can be coated with or be made of a substance including, but not limited to, a powder, a gel, a liquid, a film, or a chemical compound. The substance is configured to react with a solution. A solution includes, but is not limited to, water or any composition that will react with the substance to seal the breach.

FIG. 8 illustrates yet another embodiment, wherein a chamber of pneumatic tire 1 can have an interconnected barrier 55. The interconnected barrier 55 has primary protrusion 56A and secondary protrusion 57A. Primary protrusion 56A has an end connected to a first portion 58A of an inner wall surface of at least one chamber. Secondary protrusion 57A has an end connected to a second portion 58B of an inner wall surface of the chamber. First portion 58A of the inner wall surface is located opposite second portion 58B of the inner wall surface. Primary protrusion 56A is configured to interconnect with secondary protrusion 57A when chamber 13 has breach 54. FIGS. 8 and 9 best depict air being expelled 62 (FIG. 8) from chamber 13D through breach 54, the walls 58A and 58B of chamber 13D collapse 59 and orient primary protrusion 56A adjacent to secondary protrusion 57A, thereby, forming a seal.

The plurality of protrusions 56 and 57 can be made of any material including, but not limited to, rubber. The plurality of protrusions 56 and 57 are configured to prevent or restrict a sharp object such as a nail from movement and from penetrating adjacent chambers. Plurality of projections 56 and 57 also prevent repair tools such as a t-handle from damaging a chamber. Plurality of protrusions 56 and 57 are configured to interlock by collapsing onto each other, forming an interconnected barrier 55. In a preferred embodiment, this interconnected barrier 55 is located in the lower portion of a chamber to help protect the lower portion of the chamber.

FIGS. 8 and 9 illustrate an example of when the chamber has a breach and is collapsing, the interconnected barrier 55 will prevent the lower portion of the chamber from being damaged from a sharp object entering through the breach. Once the plurality of protrusions 56 and 57 located in the lower portion of the chamber have interlocked, the chamber walls of the upper portion of the chamber will collapse 59 as the force of the adjacent chambers on either side of the breached chamber are pressed against the breached chamber walls. However, it is within the scope of this invention for the interconnected barrier 55 to be located at any length within the chamber.

FIG. 8 illustrates pneumatic tire 1 having diaphragm 16. In a preferred embodiment, the diaphragm 16 can be made of a resilient material to allow the diaphragm 16 to expand 63 when the force of the air pressure is introduced into the diaphragm chamber and to contract when the force of the air pressure is released from the diaphragm chamber.

It is within the scope of this invention for diaphragm 16 to be made of a rigid material including, but not limited to, metal or plastic to prevent any breach from penetrating through the diaphragm 16. An inner tube attachment to the sidewalls of the tire may or may not allow room for the diaphragm chamber to expand.

In another embodiment, tire 1 or inner tube 35 could have a plurality of diaphragms 16A and 16B (FIG. 8) each having a diaphragm chamber in communication with a main valve or with a plurality of valves (FIG. 8)

In yet another embodiment, an adjustable bar could be attached to a portion of a vehicle to orient the bar to overlay the exterior portion of a tire. The bar has a plurality of indentations located on at least one outer perimeter edge of the bar. The indentations are configured to remove a sharp object from a tire. In a preferred embodiment, the indentations could be tapered to have a "V" or a "U" shape. However, it is within the scope of this invention for the indentations to have any shape capable of gripping, including, but not limited to a slit or a slot. A portion of the bar is positioned to overlay in close proximity to the tread portion of the tire. When a nail penetrates the tire, a portion of the nail may protrude from the tire. This protruding portion of the nail will make contact with the overlaying bar when the tire is rotated. When the protruded portion of the nail contacts the bar, the protruded portion of the nail will be guided into at least one indentation. Once the protruded portion of the nail is captured within the indentation, the force of the rotating tire will remove the remaining length of the nail from the tire.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A pneumatic tire having a gas receiving fitting configured to receive a supply of pressurized gas, comprising:
   said receiving fitting in pneumatic communication with a plurality of chambers;
   a plurality of valves, whereby, said plurality of chambers each having at least one valve;
   said receiving fitting having a rod, said rod is in communication with at least one biasing mechanism, said rod is connected to a plurality of linkages, said plurality of linkages is connected to said plurality of valves, said at least one biasing mechanism positioning at least one linkage so that said at least one valve of said plurality of valves is biased in a closed orientation; and,
   said rod is configured to open said at least one valve of said plurality of valves when said rod is depressed causing said at least one biasing mechanism to compress.

2. The pneumatic tire having a gas receiving fitting configured to receive a supply of pressurized gas of claim 1, wherein said at least one valve pneumatically communicates with a diaphragm chamber, whereby, said gas received by said diaphragm chamber expands a diaphragm of said diaphragm chamber.

3. The pneumatic tire having a gas receiving fitting configured to receive a supply of pressurized gas of claim 1, wherein said at least one valve pneumatically communicates with a diaphragm chamber, whereby, said gas received by said diaphragm chamber expands a diaphragm of said diaphragm chamber, whereby, exerting a force toward an outer perimeter of said tire.

4. The pneumatic tire having a gas receiving fitting configured to receive a supply of pressurized gas of claim 1, wherein said at least one chamber is in communication with a tire pressure monitor.

5. The pneumatic tire having a gas receiving fitting configured to receive a supply of pressurized gas of claim 1, wherein said tire having a nail guard layer, said nail guard layer overlaying a tread portion of said tire.

6. The pneumatic tire having a gas receiving fitting configured to receive a supply of pressurized gas of claim 1, wherein said tire having a plurality of fibers, said plurality of fibers configured to seal a breach of said tire when a portion of said plurality of fibers are retained by said breach.

7. The pneumatic tire having a gas receiving fitting configured to receive a supply of pressurized gas of claim 6, wherein said plurality of fibers being a contrasting color, whereby, said contrasting color differing from a color of said tire.

8. The pneumatic tire having a gas receiving fitting configured to receive a supply of pressurized gas of claim 6, wherein at least one fiber of said plurality of fibers having a tapered configuration, whereby, said at least one fiber having a first end having a first diameter and a second end having a second diameter, whereby said first diameter being greater in size than said second diameter.

9. The pneumatic tire having a gas receiving fitting configured to receive a supply of pressurized gas of claim 6, wherein said plurality of fibers having a layer of a substance, whereby, said substance is configured to react with a solution forming a seal within said breach of said tire.

10. The pneumatic tire having a gas receiving fitting configured to receive a supply of pressurized gas of claim 6, wherein said plurality of fibers being made of a substance, whereby, said substance is configured to react with a solution forming a seal within said breach of said tire.

11. The pneumatic tire having a gas receiving fitting configured to receive a supply of pressurized gas of claim 1, wherein a chamber of said tire having an interconnected barrier, said interconnected barrier comprising;
    a first protrusion, said first protrusion having an end connected to a first portion of an inner wall surface of said chamber;

a second protrusion, said second protrusion having an end connected to a second portion of an inner wall surface of said chamber, whereby, said first portion of said inner wall surface is located opposite said second portion of said inner wall surface; and, said first protrusion is configured to interconnect with said second protrusion when air retained within said chamber is expelled through a breach, thereby, collapsing said chamber, thereby, orienting said first protrusion adjacent to said second protrusion forming a seal.

12. A gas receiving fitting for inflation of a pneumatic tire, comprising:

said receiving fitting is configured to receive a supply of pressurized gas, said receiving fitting is configured to be in pneumatic communication with said tire, whereby, said tire having a plurality of chambers, whereby, said plurality of chambers each having at least one valve;

said receiving fitting having a rod, said rod is in communication with at least one biasing mechanism, said rod is connected to a plurality of linkages, said plurality of linkages is connected to a plurality of valves of said plurality of chambers, said at least one biasing mechanism positioning at least one linkage so that said at least one valve of said plurality of valves is biased in a closed orientation; and, said rod is configured to open a first valve of said plurality of valves when said rod is depressed to a first predetermined position of said receiving fitting.

13. The gas receiving fitting for inflation of a pneumatic tire of claim 12, wherein said rod is configured to open a second valve of said plurality of valves when said rod is depressed to a second predetermined position of said receiving fitting.

* * * * *